United States Patent [19]

Daly et al.

[11] Patent Number: 4,509,175

[45] Date of Patent: Apr. 2, 1985

[54] SEGMENTED YAG LASER RODS AND METHOD OF MANUFACTURE

[75] Inventors: Richard T. Daly; Martin G. Cohen, both of Huntington, N.Y.

[73] Assignee: Quantronix Corporation, Smithtown, N.Y.

[21] Appl. No.: 418,023

[22] Filed: Sep. 14, 1982

[51] Int. Cl.³ .............................................. H01S 3/08
[52] U.S. Cl. ..................................... 372/101; 372/62; 372/92; 372/40
[58] Field of Search ...................... 372/62, 40, 41, 66, 372/101, 92; 252/301.4 P, 301.4 H, 301.4 F

[56] References Cited

U.S. PATENT DOCUMENTS 4,163,200  7/1979  DeMaggio .......................... 372/92

Primary Examiner—William L. Sikes
Assistant Examiner—Léon Scott, Jr.
Attorney, Agent, or Firm—Kane, Dalsimer, Kane, Sullivan and Kurucz

[57] ABSTRACT

The disclosure is of a segmented YAG laser rod having segments cemented together and its method of manufacture.

9 Claims, 4 Drawing Figures

SEGMENTED YAG LASER RODS AND METHOD OF MANUFACTURE

BACKGROUND OF THE INVENTION

1. Field of the Invention

The invention relates to solid state laser rods and more particularly concerns a segmented laser rod and the method of its manufacture.

2. Brief Description of the Prior Art

Satisfying a growing demand for solid state laser (Light Amplication by Stimulated Emission of Radiation) rods currently requires relatively expensive investment in straight forward capacity expansion. This is due, in part, to the present state-of-the-art methods of manufacture. For example, the commercially-practiced method of manufacturing YAG boules from which the yag laser rods are cored is the so-called "Czochralski" method. In this method a "seed" crystal is dipped into a high temperature molten pool of the doped garnet material and very slowly rotated and withdrawn. A crystal boule of about 1 to 3 inches in diameter is formed, the length of which depends on the mass of starting melt and available process time. It takes about 2-3 weeks of steady, uninterrupted processing to produce a boule of 6-8 inches in length from which usable laser rods can be "cored" along the axial (long) direction of the boule. Any interruption or significant change ih process parameters during that time is likely to introduce a flaw in the boule at the position of the boule/melt interface. This is therefore a factor which determines the maximum length and total number of rods (i.e. the "yield") which can be cored from a boule. The mathematically-inclined will readily see that if process interruptions are random events in time, the process yield decreases exponentially with desired boule (rod) length operating at constant yield increases in production can be achieved only by increasing the number of growth stations.

Also, the Czochralski method generally produces a boule whose quality and concentration of active dopant changes along the boule length This is due to the difference in solubility of the active dopant species in the melt as contrasted with the solid crystal boule. This is called segregation. The degree of non-uniformity alcng the boule depends upon the relative mass of the final boule to the mass of the starting melt.

Because of these features of monolithic boule growth, with YAG, for example, the yield of rods of even a few inches length is generally less than 50% of the geometrically-available boule material, and the overall yield of highest quality rods suitable for example, for use in cw-pumped, TEM $_{oo}$ mode laser operation is even lower. The currently used process for producing YAG rods penalizes length by ever decreasing yield. One-inch long rods are easy, six-inch lengths very difficult and costly and ten-inch rods virtually impossible to obtain. Similar problems occur with other methods of boule growth such as the Vernuil method.

A further problem occurs with long rods, namely, a dynamic effect called "thermal focusing." The longer the rod, the more the rod focuses, and the more difficult it is to maintain the laser resonator's stability and high quality beam.

Dynamically, an optically pumped (excited) solid state laser rod, by virtue of parasitic heat generated within the rod volume, and the removal of this heat by cooling through the lateral surface, shows a radial temperature gradient. This temperature gradient, through the stresses created and the photo-optical properties of the material, causes the rod to exhibit the properties of a lens. In the case of YAG, the lens is positive and causes a focusing effect. The focal length F of this dynamically-produced effect is closely represented by the expression $$\left[ F = \frac{1}{a^2 L} \right] \text{ where}$$

where L is the length of the rod and $a$ is a parameter that depends on material properties and the level of excitation (pumping).

Since this dynamic lens is included within the laser resonator, indeed, a part of it, there exist values of F for which the resonator becomes unstable and laser action ceases or decreases markedly. This effect is often observed as a *decrease* in beam output with an *increase* in excitation (pumping).

The method of the present invention permits one to solve the above-described problems of the prior art. All of the above-described problems are greatly reduced or entirely eliminated by abandonment of the monolithic rod in favor of a composite rod, built up from sections or segments. When only short (~1") active segments are required to build a long, composite rod, the boule yield problem virtually vanishes, selection and dopant concentration matching of sections becomes feasible, compensation of dynamic focusing and birefringence can be incorporated and rods of arbitrary length can be fabricated and usefully operated.

SUMMARY OF THE INVENTION

The present invention offers a method for assembly of segments, i.e. short rod segments or slabs from boules so as to obtain a laser rod of usable length. It would be worthy to note by those skilled in the art that several common optical cements and resins were tried but they failed because of damage as a result of the high internal light intensities that are produced in a laser during operation.

The present invention describes an optical cement for joining the segments or slabs which cement does not fail under dynamic condition and has the necessary mechanical strength, ability to survive the intense light flux from both the laser beam and the pumping-lamp and an index of refraction, n, very near that of the host solid-state material.

In accordance with a specific embodiment, a glass binder is selected so that its properties match the optical and thermal expansion properties of the host solid-state material. The latter is required so that upon the application of heat to melt the glass which is interposed between two rod segments and thereafter cooled down, the glass will join the rods together at the interface without fracturing or ihtroducing stresses. The interface, in effect, disappears optically and light is not significantly reflected or scattered because the change in index of refraction at the interface is nearly zero, that is, the optical index of refraction of the host material and the glass are nearly matched or are the same. The power reflection coefficient, R, of light incident on a boundary between two regions of different index of refraction is given by $$\left[ R = \left[ \frac{n_g - n_h}{n_g + n_h} \right]^2 \right] \text{ where}$$

where $n_g$ is the index of the bonding cement and $n_h$ that of the solid-state laser host. A reflection coefficient of up to 0.5% is acceptable for good laser performance which gives, in the case of YAG ($n_h$=1.y2), ($n_g$ − $n_h$)=Δn≈≠0.26 a relatively wide range. Accordingly, the optical properties of the segmented rod produced by the present invention are essentially the same as a monolithic rod.

Thus, long sections of YAG rods are produced more easily by this invention. It is now possible to produce yag rods of indefinite length. This latter was practically impossible heretofore by conventional crystal growth technology.

A further object is to provide a segmented laser rod in which the rod segments are cemented with compensation of focusing provided between the segment ends by interposed negative or positive lenses formed by the cement, with the cement having higher or lower index of refraction than the laser segments as the case may be for static compensation.

To illustrate this, note that if the rod segments to be joined were prepared with concave figures on the faces to be joined (negative radius of curvature) and, the bonding cement, which will fill the lens-like volume between them, has an index of refraction *lower* than the host by an amount Δn, this volume will act as a negative (diverging lens) with focal length F= −r/2Δn where r is the radius of curvature of the concave figure given to each of the mating surfaces. With YAG, for example, a strongly-pumped rod of 4" length will exhibit a dynamic focusing F≈+100 cm. For a value Δn=0.25, a concave figure on the internal faces of a two segment rod of r≈52 cm, the dynamic effect will be cancelled and the laser's stable operating range significantly extended.

Still another object is to join boule slabs or rod segments selected to match each other in concentration of dopants such as neodymium in the case of doped YAG materials, to thereby provide laser rods that are predictably more uniform in the length direction. For example by assembly of the segmented rod from short segments all of which are cored from the same region along the boule axis, the lengthwise variation in dopant concentration will be minimized.

A still further object is to reduce the cost of laser rods by providing a segmented rod deploying relatively inexpensive undoped segments of the rod ends for mechanical mounting support.

There are many advantages associated with the method of the invention. Among these advantages are improvement in rod uniformity, quality, lower cost by virtue of increased boule yield, the ability to easily introduce compensation for dynamic distortions, and the ability to produce "jumbo-sized" laser rods. Other advantages will be apparent to those skilled in the art from the following description of the preferred embodiments of the invention.

DETAILED DESCRIPTION

Yttrium-aluminum-garnet (YAG) boule manufacturing techniques are well known, including those which provide doped boules, i.e., doped with, for example, neodymium, erbium or other rare-earth elements. In the method of the present invention, relatively short YAG and doped YAG rods or slabs cut from boules are assembled to form a segmented laser rod or "boule" of relatively greater length.

Figure 1:
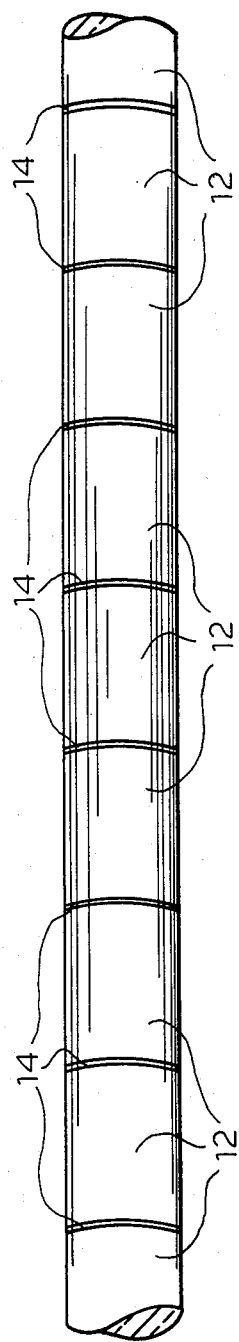
FIG. 1 shows a diagrammatic cross-sectional, side elevation of a portion of a segmented YAG laser rod of the invention.

Referring now to the accompanying drawings there is seen in FIG. 1 an enlarged, cross-sectional side elevation of an embodiment of a segmented laser rod 10 of the invention. The rod 10 is made up of a plurality of segments or slabs 12 of YAG or doped YAG fashioned so that when assembled together and joined by an optical glass cement 14, a segmented laser rod or boule is obtained. The glass cement 14 is an optical glass composition which satisfies the following criteria:

(a) refractive index match ±0.5 (i.e.=index of laser host material ±0.5) (Note: matching does not mean precisely equal).
(b) expansion coefficient match to YAG ±5%.
(c) non-solarizing (i.e. no optical degradation in high ambient pump light.
(d) optically linear and non-absorbing at laser wavelength (i.e. does not behave non-linearly or degrade under laser dynamic conditions).
(e) strength comparable to host.
(f) compatible with host material, i.e. no undesirable chemical reaction.
(g) water insoluability where water cooling of rod is used.

An example of a glass which satisfies these criteria is one having the following approximate stoichiometry:

|  | PERCENT BY WEIGHT |
| --- | --- |
| PbO | 70.0 |
| $B_2O_3$ | 4.0 |
| $SiO_2$ | 22.0 |
| $Al_2O_3$ | 4.0 |

This glass cement has an index of refraction of n=1.82; a thermal expansion coefficient of $71 \times 10^{-7}/°C$., a bond strength of 22,000 PSI, and a laser damage threshold of 72 $MW/cm^2$. It is also non-solarizing and water insoluble.

Other glass compositions of different refractive index and/or expansion coefficient are readily formulated knowing the desired index of refraction and thermal expansion coefficient by superimposing the graphs appearing in the article "Properties of Low - Temperature Solder Glass" by John Gallup and A. G. F. Dingwall appearing in Ceramic Bulletin, Volume 36, No. 2 (1957). The example stoichoimetry given above differs from those in Gallup and Dingwall in that the example includes a few percent of $Al_2O_3$ while Gallup and Dingwall omit this constituent. The $Al_2O_3$ in the given example is included to stablize and inhibit phase-separation in the glass.

Figure 2:
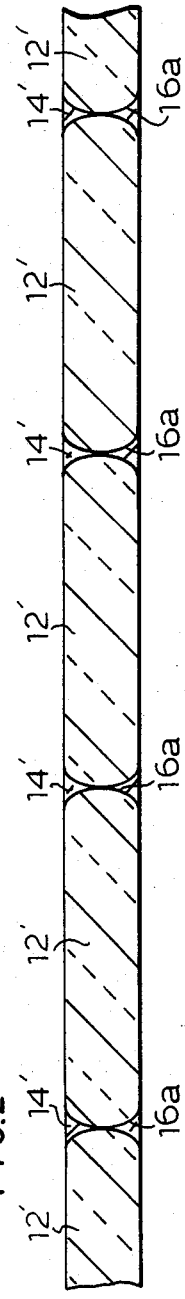
FIG. 2 is a diagrammatic view of segments having positive radius of curvature on their end faces.
Figure 3:
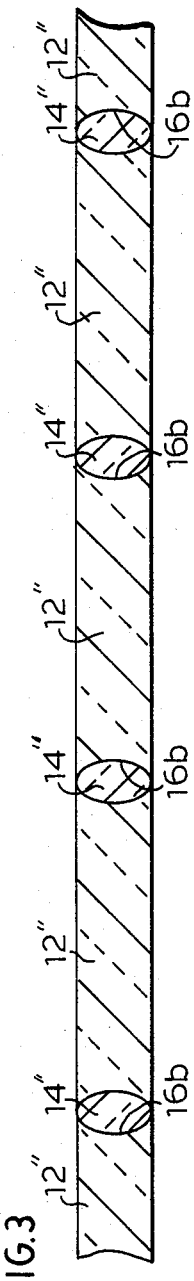
FIG. 3 shows segment ends having negative radius of curvature on their end faces.
Figure 4:
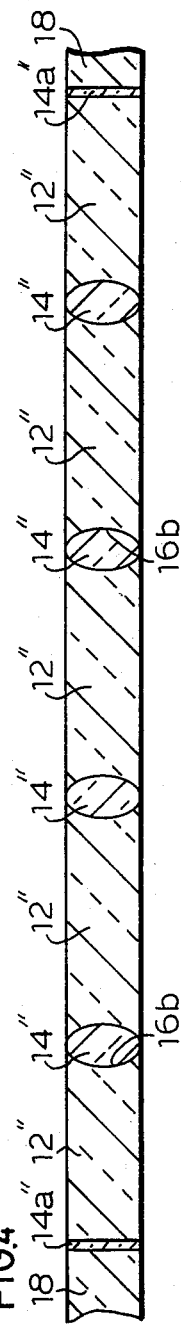
FIG. 4 is a schematic elevational view of a segmented YAG laser rod having undoped end segments cemented to intermediate doped segments.

FIGS. 2 and 3 show configurations that provide for static (fixed) focus compensation. In FIG. 2, each segment 12' is provided with positive radius of curvature at its internal ends 16a. The interposed optical glass cement 14' is in a lens configuration providing negative static focus compensation when the refractive index of the cement is greater than that of the segment. On the other hand, the internal ends 16b of the segments 12" possess a negative radius whereby the interposed cement 14" is in a lens configuration providing negative static compensation in the case where the index of the cement is less than that of the segment.

The present invention also contemplates securing at each end of the segmented rod, undoped YAG segments 18 which together with the doped YAG segments 12a" are provided either with parallel flat ends 16c with cement 14a" interposed therebetween, or also can also be figured as described above to provide focusing/defocusing effects. In this fashion less costly segments 18 may be deployed at the rod ends where no excitation is occurring for engaging with the rod supports or clamps as compared to costly use of monolithic rod length deployed today.

The following examples describe the manner and process of making and using the invention and set forth the best mode contemplated by the inventors but are not to be construed as limiting the invention.

Method of Making Glass Cement

The oxide components of the glass cement are weighed and mixed in proportions described above to provide a 1 kg batch. The mixed batch is first melted in an 0.5 liter fused silica crucible at 1000° C. and held for 45 minutes before being transferred to a precleaned 0.5 liter platinum crucible. After transfer, the glass is refined at 1400° C. for two hours with constant stirring at 45 rpm. After completion of refining, the temperature is decreased to 1100° C. and the stirring speed reduced to 30 rpm. These conditions are maintained for one half hour for clarification and as a precaution against striae. The glass is cast at 1100° C. into a $50 \times 150 \times 30$ mm$^3$ graphite-coated stainless steel mold and cooled at 20° C./hr. from 1100° C. to room temperature. The glass thus formed is of sufficient optical quality to be used as a YAG rod cement.

Method of Assembling A Segmented Laser Rod

In this example, two 40 mm long, 4 mm diameter Nd doped YAG rod segments are to be joined to produce one 80 mm long laser rod.

The faces to be joined are lapped flat (but not necessarily optically flat) using 5 micron $Al_2O_3$, then washed with detergent and blown dry with dry nitrogen. Perpendicularity of the end faces to be joined with respect to the segment axes is maintained to about 5 minutes of arc. A coin-shaped piece of the glass cement previously described is cut and ground and lapped down to $\approx 0.01$ inch thickness. Its transverse dimensions (diameter) slightly exceed those of the YAG segments above.

One of the rod segments and the glass preform are mounted in a quartz fixture such that they are stacked with the rod segment axis vertical, preform resting on the upper face. The fixture carrying the rod segment and preform are placed into a fused silica tube and the tube with the fixture is lowered into a muffle furnace which has been preheated to 1100° C. After approximately 8 minutes the silica tube and quartz fixture are withdrawn and allowed to cool sufficiently to allow the final assembly step. At this point the glass preform will be seen to have melted and wetted the rod face. Furthermore, because of surface tension forces, the surface of the glass will be seen to be spherical, much like the shape of a water droplet on a flat surface. (In the case of large diameter rod segments, the glass surface may show a dimple near its center and it may be necessary to invert the fixture, reheat to melting and cool again).

The final step consists in placing the second rod segment into the fixture, aligned, with its end surface resting on the spherical glass surface. A weight of 100 grams is placed atop the second rod segment which is free to slide axially, slightly. The fixture is replaced into the silica tube and is reheated as above. The force provided by the weight of the second segment plus the 100 gram weight forces the segment faces into intimate contact and squeezes the excess glass out of the bond zone.

After cooling, the now-bonded rod is given a light centerless grind to remove excess glass which was squeezed from the joint.

Method of Testing Segmented Rod

The length of the composite rod compared to the combined lengths of the original segments will show less than 0.001 inches for the bond section thickness. The bond section should not be visible to the naked eye when looking through the rod, indicating good index of refraction match between the glass cement and YAG. Images should be transmitted undistorted through the composite road indicating a high level of homogenity of the index of refraction of the glass cement. Polariscope inspection of the rod should show no extra birefrigence due to the bonding process, indicating a very good match in thermal expansion coefficients between the glass cement and YAG crystal.

After satisfying all of the above passive tests, the rod ends are optically polished and antireflection coated as with a monolithic rod so that active laser tests can be performed. The rod is installed inside a standard water-cooled laser pump cavity. A DC Krypton arc lamp is used to provide pump radiation at approximately a 4.4 kW input level, a standard condition for this rod size. Two flat mirrors, one 99.96% reflective, the other 88% reflective, are used to establish laser oscillation when placed about 50 cm apart with the rod located centrally between them. The CW multimode output power of this laser oscillator will measure about 50 W.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. In a laser rod, which comprises a plurality of rod segments joined to each other by optical cement the improvement comprising: each surface of adjacent ends of the segments having a radius or figure, the interposed cement having a predetermined refractive index and is in the configuration of a lens for compensation of dynamic focusing.

2. The invention in accordance with claim 1, wherein at least one surface of adjacent ends of the segments has a positive or negative radius and the interposed cement which has a refractive index different from the segment is in the configuration of a diverging lens for compensation of positive dynamic focusing.

3. The invention in accordance with claim 1, wherein at least one surface of adjacent ends of the segments has a positive or negative radius and the interposed cement which has a refractive index different from the segments is in the configuration of a converging lens for compensation of dynamic defocusing.

4. A YAG laser rod, which comprises a plurality of YAG segments, at least one surface of adjacent ends of the segments having a radius, the segments being joined by an optical glass cement, the interposed cement having a predetermined refractive index and is in the configuration of a lens for compensation of dynamic focusing.

5. The invention in accordance with claim 4, where the surfaces of at least one of the adjacent ends of the segments has a positive radius (convex) and the interposed cement which has a refractive index higher than 1.82 is in the configuration of a negative lens for compensation of dynamic focusing.

6. The invention in accordance with claim 4, wherein at least one surface of adjacent ends of the segments has a negative radius (concave) and the interposed cement which has a refractive index less than 1.82 is the configuration of a negative lens for compensation of dynamic focusing.

7. A method of manufacturing a segmented laser rod which comprises:
   providing a plurality of slabs cut from boules perpendicular to the axis of boule growth direction and prepared for assembly into a segmented boule;
   assembling the slabs into a segmented boule form by adhering adjacent slabs together with a cement; and
   coring and fabricating laser rods from said segmented boule.

8. A method of manufacturing a composite rod with integral lenses for compensation of focusing comprising:
   providing a plurality of laser rod segments;
   providing at least one spherical radius on an adjacent segment end faces;
   interposing a cement with index of refraction different from said rod segments between the ends; and
   forming with the cement a lens configuration between the ends.

9. The invention in accordance with claim 8, wherein the segments are doped YAG material and the segments of the ends of the segmented rod are undoped YAG material.

* * * * *

UNITED STATES PATENT AND TRADEMARK OFFICE
CERTIFICATE OF CORRECTION

PATENT NO. : 4,509,175
DATED : April 2, 1985
INVENTOR(S) : Richard T. Daly and Martin G. Cohen It is certified that error appears in the above-identified patent and that said Letters Patent is hereby corrected as shown below:

Column 1, line 28, "ih" should be --in--.

Column 1, line 44, "alcng" should be --along--.

Column 2, line 60, "ihtroducing" should be --introducing--.

Column 3, line 11, " $\neq$ 0.26" should be -- $\pm$ 0.26--.

Signed and Sealed this

Sixteenth Day of July 1985

[SEAL]

Attest:

DONALD J. QUIGG

Attesting Officer     Acting Commissioner of Patents and Trademarks